US010746627B2

(12) United States Patent
Knestel et al.

(10) Patent No.: US 10,746,627 B2
(45) Date of Patent: Aug. 18, 2020

(54) MULTIPLE CONFIGURATION WIND TUNNEL BALANCE AND METHOD FOR CONVERTING THE WIND TUNNEL BALANCE

(71) Applicant: MAHA-AIP GmbH & Co. KG, Haldenwang (DE)

(72) Inventors: Anton Knestel, Hopferbach (DE); Christian Hartmann, Altusried (DE); Thomas Becherer, Dietmannsried (DE)

(73) Assignee: MAHA-AIP GMBH & CO. KG, Haldenwang (DE)

( * ) Notice: Subject to any disclaimer, the term of this patent is extended or adjusted under 35 U.S.C. 154(b) by 68 days.

(21) Appl. No.: 15/555,949

(22) PCT Filed: Mar. 4, 2016

(86) PCT No.: PCT/EP2016/054608
§ 371 (c)(1),
(2) Date: Sep. 5, 2017

(87) PCT Pub. No.: WO2016/139325
PCT Pub. Date: Sep. 9, 2016

(65) Prior Publication Data
US 2018/0038766 A1 Feb. 8, 2018

(30) Foreign Application Priority Data
Mar. 5, 2015 (DE) .................. 10 2015 204 020

(51) Int. Cl.
*G01M 9/06* (2006.01)
*G01M 17/007* (2006.01)
*G01M 9/04* (2006.01)
(52) U.S. Cl.
CPC .............. *G01M 9/062* (2013.01); *G01M 9/04* (2013.01); *G01M 17/0074* (2013.01)

(58) Field of Classification Search
CPC ......... G01M 17/0074; G01M 9/02–04; G01M 9/062; G01M 17/007; G01M 17/0072; G01M 17/045; B65G 2812/02217
(Continued)

(56) References Cited

U.S. PATENT DOCUMENTS 4,073,188 A * 2/1978 Slezinger ................ G01M 9/04
73/116.01
4,700,566 A * 10/1987 Hafner ...................... G01L 5/16
177/DIG. 9
(Continued)

FOREIGN PATENT DOCUMENTS

DE     19702421 A1 *  8/1998  ........ G01M 17/0074
DE   102008032380 A1 *  1/2010  ............ G01M 9/062
(Continued)

OTHER PUBLICATIONS

Machine Translation of DE10201108564 (Year: 2019).*
(Continued)

*Primary Examiner* — David L Singer
(74) *Attorney, Agent, or Firm* — Womble Bond Dickinson (US) LLP

(57) ABSTRACT

Wind tunnel test stand for motor vehicles convertible into multiple configurations including a one-belt, three-belt and/or five-belt configuration. The wind tunnel test stand includes force sensors for sensing forces between a weighing platform and a test stand frame, a belt unit with a conveyor belt, and a carriage accommodating at least one belt unit, where the carriage is supported relatively movably with respect to the test stand frame in X- and Y-directions.

19 Claims, 6 Drawing Sheets

(58) Field of Classification Search
USPC ....... 73/116.07, 147, 118.01, FOR. 111, 670, 73/856, 123–127, 116.06
See application file for complete search history.

(56) References Cited

U.S. PATENT DOCUMENTS

| | | | | |
|---|---|---|---|---|
| 4,843,873 | A * | 7/1989 | Harald | G01L 5/16 |
| | | | | 73/147 |
| 5,111,685 | A * | 5/1992 | Langer | G01M 17/0074 |
| | | | | 73/118.01 |
| 5,136,879 | A * | 8/1992 | Kaizu | G01M 17/0074 |
| | | | | 73/116.07 |
| 6,427,528 | B1 * | 8/2002 | Yamakado | G01M 17/0072 |
| | | | | 73/121 |
| 6,457,352 | B1 * | 10/2002 | Knestel | G01M 17/0072 |
| | | | | 73/117.03 |
| 7,614,291 | B2 * | 11/2009 | Ebeling | G01M 17/0072 |
| | | | | 73/116.07 |
| 8,042,408 | B2 * | 10/2011 | Geyer | B25J 15/04 |
| | | | | 73/856 |
| 2006/0237237 | A1 * | 10/2006 | Kerschbaum | G01M 9/062 |
| | | | | 177/145 |
| 2007/0039400 | A1 * | 2/2007 | Meyer | G01L 5/161 |
| | | | | 73/862.41 |
| 2010/0175465 | A1 * | 7/2010 | Kato | G01M 9/04 |
| | | | | 73/147 |
| 2010/0251832 | A1 * | 10/2010 | Kirkpatrick | G01L 3/22 |
| | | | | 73/862.191 |
| 2011/0277560 | A1 * | 11/2011 | Barnett | G01L 5/161 |
| | | | | 73/862.045 |
| 2013/0104670 | A1 * | 5/2013 | Saari | G01L 5/0052 |
| | | | | 73/862.381 |

FOREIGN PATENT DOCUMENTS

| | | | | |
|---|---|---|---|---|
| DE | 102008036315 A1 * | 1/2010 | | G01M 9/062 |
| DE | 102011085640 A1 * | 5/2013 | | G01M 9/04 |
| EP | 1338881 A1 * | 8/2003 | | G01M 9/04 |
| JP | 58035435 A * | 3/1983 | | G01M 9/04 |
| JP | 2001324409 A * | 11/2001 | | |

OTHER PUBLICATIONS

Machine Translation of DE102008036315 (Year: 2019).*
Merriam-Webster Dictionary, definition: carriage (Year: 2014).*
Merriam-Webster Dictionary, definition: belt (Year: 2014).*
"International Search Report for PCT Application No. PCT/EP2016/054608 dated Jun. 15, 2016", 5 pages.
"Written Opinion for PCT Application No. PCT/EP2016/054608 dated Jun. 15, 2016", 12 pages.

* cited by examiner

MULTIPLE CONFIGURATION WIND TUNNEL BALANCE AND METHOD FOR CONVERTING THE WIND TUNNEL BALANCE

CROSS-REFERENCE TO RELATED APPLICATIONS

This application is the U.S. National Stage entry under 35 U.S.C. § 371 of international application PCT/EP2016/054608, filed 4 Mar. 2016, which in turn claims priority to German patent application DE 10 2015 204 020.8, filed 5 Mar. 2015.

BACKGROUND

The wind tunnel balance or wind tunnel test stand described herein and the associated method allow a quick conversion of the wind tunnel balance, for example, from a five-belt configuration to a one-belt configuration and vice versa. The wind tunnel balance described herein is, in particular, configured such that the conversion may be performed with an exchange of only a few wind tunnel balance components and with high process reliability and accuracy. The measurement accuracy of the wind tunnel test stand is very high in all configurations, in particular in one-belt and three-belt configurations, and even the smallest forces of, e.g., a few Newton may be reliably detected.

During the development of motor vehicles such as passenger cars or racing cars, these cars are usually tested in wind tunnels with regards to their aerodynamic properties. In order to measure forces acting on the vehicle in these aerodynamic tests, different test stands and wind tunnel balances were used up to now depending on a test target and a type of the vehicle. In wind tunnel balances, a realistic air flow is blown onto the vehicle by a large fan. In order to form it in an aerodynamically realistic manner, the vehicle underbody has to move at wind speed.

Known test stand types have, for example, a different number of belt units, and accordingly one-belt, three-belt, and five-belt test stands are distinguished. The coordinate system of the test stands is usually selected such that the X-axis extends in the direction of travel of the conveyor belt of the test stand or wind tunnel balance. The Y-axis is transverse to the conveyor belt. The Z-axis extends from the surface of an upper run of the conveyor belt away from the conveyor belt. This coordinate system is also used in the figures described below.

In the so-called five-belt systems, the flow at the vehicle underbody is simulated by a so-called middle conveyor belt or middle belt. Herein, the middle conveyor belt here only so wide that the vehicle wheels and the supports (rocker supports or rocker panels) do not rest on the middle band. The wheels of the vehicle rest on up separate wheel belt units which are as compact as possible.

In other words, a middle belt unit and, laterally thereof, four smaller (wheel) belt units are provided in a five-belt test stand. Usually, a motor vehicle rests on the four side belt units and the belt units are weighed.

Five-belt test stands are preferably used in measuring and testing passenger cars, since frequently mounting motor vehicles on a five-belt test stand is less time consuming than on one-belt test stands. One-belt test stands are particularly preferred for motor vehicles with high output powers, such as racing cars, which usually generate much higher output powers than passenger cars or series-production vehicles.

In competition vehicles (sports or racing cars), the complete vehicle or a model of the vehicle is placed on a single large conveyor belt. This configuration is typically referred to as a one-belt test stand (configuration) or a single belt test stand. The conveyor belt of the one-belt test stand is wider than the (maximum) width of the vehicle and longitudinally extends beyond the vehicle, in particular rearward of the vehicle.

In other words, one-belt test stands usually have a belt unit with a wide continuous conveyor belt which rotates on two rollers or drums. For aerodynamic tests, the motor vehicle is positioned with all wheels on this single conveyor belt (therefore one-belt test stand) and fixed with respect thereto. This is accomplished, for example, with fixing devices that are situated to the side of the conveyor belt. The wheels may be supported on mounts which may be positioned underneath the upper run of the conveyor belt, between the rollers. The mounts may include weighing pads or the like, such that Z-forces may be detected through the belt. (In this context, this is referred to as a through-belt measurement)

In particular, one-belt test stands are the preferred choice in measuring and testing racing cars, since, inter alia, an accurate picture of output powers can be obtained that are of particularly great importance in racing cars.

It should be noted that the through-belt measurement described above may also be applied to three-belt, five-belt, and seven-belt test stands. In three-belt test stands, the tires of the vehicle rest on narrower side belt units. To simulate the driving surface, a so-called middle belt runs between the conveyor belts of the side belt units. The through-belt measurement takes place at the two side belt units. In five-belt test stands, the through-belt measurement is used, in particular, when the track width of a vehicle is less than or equal to the width of the middle belt, and the motor vehicle only rests on the middle band.

Various motor vehicle manufacturers are engaged in producing both series production vehicles and competition vehicles. As the construction of a wind tunnel with high-performance fans entails high cost, there is a desire for a convertible/retrofittable test stand which allows for a quick conversion from a so-called five-belt system to a "single-belt system" or three-belt system. Herein, it is also conceivable that the single-belt system consists of several sub-belts.

DE 10 2008 036 315 B4 describes a wind tunnel test stand which is convertible from a five-belt configuration to a three-belt configuration. On the weighing platform described therein, wheel belt units may be installed, which, along with a fixedly installed middle conveyor belt, constitute a five-belt configuration. The four wheel belt units may be removed and two single lateral conveyor belts may be arranged on the weighing platform.

Since the large and heavy side belts are mounted on the weighing platform, the weighing platform must bear large weights. However, this reduces the accuracy of the weighing platform and the large mass that weighs on the weighing platform reduces the natural resonance of the balance undesirably. Another very significant disadvantage is the fact that parasitic forces or fictitious forces and rolling resistances of the wheels cannot be separated from aerodynamic forces on the side belts.

In DE 10 2011 085 640, a one-belt wind tunnel test stand is described which makes it possible, in particular, that fictitious forces (e.g., generated by the fixation of the vehicle) and rolling resistances of the wheels may be separated from aerodynamic forces. The conveyor belt or the one-belt unit is supported floatingly/slidably. A movement in the X- and/or Y-direction is supported on the weighing platform via force measuring means. The one-belt unit is decoupled from the weighing platform in the Z-direction with respect to force transmission, while such a force coupling is provided for the X- and/or Y-direction. However, a disadvantage of this wind tunnel test stand is that the system is not convertible, for example, from a one-belt to a five-belt configuration, or only convertible at great expenditure of time.

SUMMARY

There is a need for wind tunnel balances or wind tunnel test stands which can test both passenger cars and racing cars without having to forgo the advantages of the respective test stand types or test stand configurations, in particular, on-belt, three-belt and five-belt configurations, and which allows for the highest possible accuracy in the measurement of forces in all configurations. However, the provision of two (or more) different test stand types in different wind tunnels is very cost-intensive and therefore uneconomical.

Consequently, there is a need for a wind tunnel test stand or a wind tunnel balance and an associated method, which allows for a conversion from one test stand type to another test stand type with relatively low expenditure of time and structural complexity, wherein the measurement accuracy in each configuration is as high as possible. In other words, there is a need for a method and a wind tunnel balance, which has different configurations in terms of the number of belt units and offers very high measurement accuracy— along with the possibility quickly and reliably performing a change between the configurations.

The object is achieved by the invention according to the independent patent claims. Further preferred developments are described by the dependent claims.

One aspect of the invention relates to a wind tunnel test stand. Preferably, this may be a multiple configuration wind tunnel test stand, which may be convertible at least to a one-belt, three-belt and/or five-belt configuration.

The wind tunnel test stand may comprise a test stand frame for receiving forces that can, for example, act on a motor vehicle to be tested and a (weighing) platform. The weighing platform may be supported movably with respect to the test stand frame.

The relative movement of the weighing platform with respect to the test stand frame may be implemented, in particular, via two preferred options. Elastic components may be provided which allow for a (possibly very small) spring travel as a relative movement. These elastic components may be particularly preferred force sensing means which can detect the transmitted force. Another way to allow for a relative movement is to permit a free relative movement at least within a predetermined range of movement. In contrast to relative movability, in particular, a (rigid) (movement) coupling may be considered, which neither allows for a relative movement over a free distance nor allows for a relative movement via spring travel. Herein, spring travel may also mean a small deformation, such as one performed by piezoelectric material when subjected to pressure.

In other words, "relative movability" is to be understood such that a free movement in the corresponding direction and relative to the mentioned second component is possible. Alternatively or additionally, "relative movability" may also mean that at least one force sensing means is provided between the two parts/components movable with respect to each other. For example, the relative movability between test stand frame and weighing platform may be achieved, in a particularly preferred embodiment, by the weighing platform being connected to the test stand frame in X-, Y- and Z-directions via at least one force sensing means. Another example would be a carriage described in detail below which may be supported movably relative to the frame test stand, for example in the X-direction, by these two components being connected in said (X-)direction by means of at least one force sensing means.

Furthermore, at least one force sensing means may be provided which may be arranged between the weighing platform and the test stand frame in order to sense, for example, forces between the weighing platform and the test stand frame. The force sensing means may preferably comprise load cells and/or strain gauges. Using the force sensing means, forces may preferably be both transmitted and sensed. When one or more force sensing means are arranged between the platform and the test stand frame, for example, forces that occur between these components or are transmitted therebetween may be sensed, which forces may result, in particular, from forces, which may act on the vehicle, on the belt unit, and on the conveyor belt.

Moreover, the wind tunnel test stand may comprise at least one belt unit having two rollers and a conveyor belt wound thereabout. In the case of wheel belt units, side belt units, and one-belt unit, this belt unit may be provided for supporting at least one vehicle wheel of the motor vehicle to be tested. Usually, no wheels are resting on a middle belt unit since it has to simulate the driving surface, in particular. The belt unit(s) may, for example, comprise at least one belt unit frame on which the conveyor belt may be arranged which may be wound around the at least two rollers.

Depending on the configuration, the belt unit(s) may be designed differently. A one-belt unit of a one-belt configuration may be wider and longer than the motor vehicles to be tested. Side belt units of a three-belt configuration may be relatively narrow (so that the wheels may be rest thereon) and be longer than a motor vehicle. A middle belt unit may be longer than a motor vehicle to be tested and narrow enough so that the wheels protrude beyond the width or side edges on the right and left. Wheel belt units of a five-belt configuration may be relatively compact so that a wheel of a motor vehicle to be tested can rest thereon. Preferably, the three-belt configuration may reproduce a one-belt configuration, wherein the two side belts and the middle belt can adopt the technical functionality of the single belt of a one-belt configuration. An advantage of a three-belt configuration is that the side belt units each weigh less than a single belt unit, so that the side belt units can be moved, installed, or removed with less effort.

Moreover, the test stand may comprise a carriage for accommodating at least one belt unit. Particularly preferably, the carriage may hold or accommodate a belt unit of a one-belt or three-belt configuration. This is intended to mean in particular that the corresponding belt unit may rest on the carriage. Very particularly preferably, a further fastening of the belt unit to the carriage may be omitted (but is possible), since the belt unit already safely rests on the carriage due to the weight force. If a fastening is to be provided, in particular, automatic fastening options such as formfitting connecting elements, which engage with each other when the belt unit is placed on the carriage, are preferred.

The carriage can be preferably supported movably in the X- and/or Y-direction relative to the test stand frame. This may preferably be achieved by means of a floating mount, on which the carriage may be mounted. Such a floating mount may direct forces in Z direction to a mount base, for example to a foundation, the test stand frame or the like— depending on where the floating mount rests upon. The floating mount may also allow as frictionless a movement as possible in the other directions, in particular the X- and Y-directions, wherein a movement in one of the two aforementioned directions may be restricted or prevented by structural measures. The floating mount may comprise, for example, sliding mounts, fluid mounts and/or roller mounts.

The relative movement that can be performed by the carriage with respect to the test stand frame may preferably be a translation. More preferably, the carriage may be supported movably relative to the test stand frame in one of the X- and/or Y-direction over a minimum elastic spring travel. The minimum spring travel may particularly preferably be the spring travel of a force sensing means which may be arranged along the corresponding direction between test stand frame and the carriage to sense transmitted forces.

In other words, the carriage supported as free of friction as possible may be used to receive the weight of a one-belt unit of a one-belt configuration or of side belts or side belt units of a three-belt system. The carriage is supported in a largely friction-free manner, i.e., floatingly (in the X- and Y-direction).

Furthermore, it is advantageous that the carriage may remain in the test stand at all times. The carriage may make it possible, that the three-belt side belt units and the one-belt unit do not have to be placed with their weight on the weighing platform, resulting in improved measurement accuracy. In the five-belt configuration, the carriage may remain in the system, so that the conversion takes less time and effort.

In summary, the wind tunnel test stand includes, so to speak, (at least) a 3-in-1-configuration, i.e., a wind tunnel balance, which allows for a conversion of the wind tunnel balance, for example, from a five-belt configuration to a one-belt configuration and vice versa with relatively low expenditure of time and structural complexity. The carriage makes it possible to receive the weight of at least the one-belt unit in the one-belt configuration and at least the side belt units in the three-belt configuration and to divert it away from the weighing platform. At the same time, a force-type coupling (except for forces in the Z-direction) with the weighing platform is enabled, so that forces can be guided/supported to/on the platform in a predetermined or desired direction. Placing the one-belt unit or the side belt units on the frame may be performed with relative low complexity of assembly, so that a change of the configurations can be facilitated and accelerated.

Furthermore, the carriage may be coupled to the weighing platform in such a way (rigidly) in the X- and/or Y-direction, that a relative movement between the carriage and the weighing platform in the corresponding direction may be inhibited (or rigid). Herein corresponding direction means that when, for example, a (rigid) coupling in the X-direction is present, a relative movement in the X-direction is excluded, that is, the two units, weighing platform and carriage, then move in the X-direction in unison. When no coupling or an elastic coupling is used, the support of the carriage preferably allows for a relative movement in the X- and Y-directions.

An above-mentioned (rigid) coupling can be achieved, for example, with a connecting device which can couple the weighing platform and the carriage with each other. Particularly preferably, the coupling device may couple the two components in as friction-free a manner as possible.

When, for example, a coupling in the Y-direction, which may be particularly preferable, is established, guides, sliding mounts and/or roller mounts may be arranged on side parts of the carriage and the weighing platform which prevent a relative movement of the two components in the Y-direction, but allow a movement of the weighing platform relative to the carriage or the carriage relative to the weighing platform in the X-direction in as friction-free a manner as possible. In other words, in this case the carriage is preferably supported in as friction-free a manner as possible, i.e. floatingly: in Z-direction, the carriage rests on a mount and transmits forces in Z-direction to the mount; in Y-direction, the carriage is connected or (rigidly) coupled to the weighing platform. In X-direction, the carriage and the belt unit(s) arranged thereon may move freely or elastically (relative to the weighing platform). The X-direction may, e.g., be attached to the weighing platform via an additional measuring means which will be described below and may, for example, sense ventilation losses, rolling friction losses, and the like. Supply lines for hydraulics, electricity, water and the like may preferably remain screwed to the mounted carriage. The belt unit(s) may be connected to the media (ports) by weight alone when placed on the carriage.

Other coupling means or connecting devices may comprise guide rods or air mounts. Furthermore, hydrostatic and/or pneumatic mounts may be provided. Hydrostatic mounts are, for example, all types of mounts that allow for substantially frictionless mounting by means of oil or water pressure. Pneumatic mounts include, e.g., air pressure mounts. A guide pin (piston, rod or means) may be used, which slides in a guide frame in friction-free manner and may, for example, be hydraulically or pneumatically positioned in Z-direction. The guide receptacle may be designed depending on the shape of the guide pin and depending on the required force transmission direction. In case of an essentially cylindrical guide pin and a desired force transmission between the belt unit or carriage and the platform in X- and Y-directions (e.g., rigid X- and Y-coupling), the guide receptacle may preferably substantially be a cylindrical bore or recess.

Furthermore, the (rigid) coupling may cause the coupled composite of carriage and weighing platform to transmit (global) forces to the test stand platform. Thus, in a (rigid) Y-coupling, a relative movement of said composite towards the test stand platform may be detected by force sensing means and the transmitted force may be sensed. When a relative movement between the weighing platform and the carriage is permitted, a (relative or internal) force, which could not be made apparent in a rigid coupling as an internal force, may be made apparent by means of a force sensing means. Thus, for example, a set-up with a rigid Y-coupling and additional disturbing-force sensing means in the X-direction may be suitable to sense or visualize X-by-wheel forces in addition to the "global" X-forces. X-by-wheel forces may include ventilation or wheel friction force losses at the wheels of the motor vehicle.

Thus, the relatively movably supported carriage may thus make it possible that large weights of belt units do not directly rest on the weighing platform, so that the measurement accuracy of the test stand is increased and the natural frequencies are not decreased. In addition, internal forces can be visualized, i.e., cut free, and a quick change of belt units/configurations is made possible. The quick change is made possible, inter alia, by allowing the belt units to rest directly on the carriage and by omitting additional fastening.

In a one-belt configuration, a one-belt belt unit may be arranged on the carriage. One-belt units have particularly large masses, the weight of which does not rest on the weighing platform, as is common in known wind tunnel balances, due to the present invention.

In a three-belt configuration at least two side belt units may be arranged on the carriage which also have relatively large masses. Additionally, the middle belt unit of a three-belt configuration may also be optionally arranged on the carriage.

In the three-belt or five-belt configuration, a middle belt unit may be provided between wheel belt units of the five-belt configuration or side belt units of the three-belt configuration. The wheel belt units or side belt units are usually provided to let the wheels of the motor vehicle to be tested rest thereon. The middle belt unit may be arranged on the carriage, in particular in the case of three-belt configuration. Furthermore, the middle belt unit may be fixedly supported. Herein, fixedly supported is intended to mean that the unit is fixed in all directions in space, i.e., no relative movement/motion in any direction is possible. In this context, fixedly supported may mean that the middle belt unit can rest on a foundation of a wind tunnel/test stand or that the middle belt unit can be arranged on the test stand frame. The test stand frame may be rotatably supported with respect to a foundation, and, in this case, the middle belt unit would only be fixed with respect to the test stand frame. The fixed support has the advantage that no aerodynamic forces are introduced into the weighing platform or the carriage, i.e., that there is a force decoupling.

In the case of the five-belt system, the middle belt unit may be also rest or be placed on the carriage.

The carriage can divert forces in Z-direction to an environment and may be slidably supported in the X- and Y-directions. For example, one (or more) floating mount(s) described above, which may be arranged, for example, on the foundation of the test stand or the test stand frame, may be used for supporting the carriage. In other words, the term "environment" may mean that the carriage receives Z-forces, in particular gravitational forces, and does not transmit them to the weighing platform. This mounting has the advantage that the weights of the belt units or of part of the belt units, which are not subject to testing, are not even included in the measurement, so that these weights, which can be large, also do not reduce the measurement accuracy.

The weighing platform may comprise at least two sub-platforms which may be separable (from each other). These at least two sub-platforms may be connected to each other in a five-belt configuration of the wind tunnel test stand. In a three-belt or one-belt configuration of the wind tunnel test stand, the first (upper) sub-platform may preferably be separated from the second (lower) sub-platform and may preferably be removed from the test stand.

On the first sub-platform, at least one wheel belt unit and a fastening device may be disposed, preferably pre-installed, for the five-belt configuration. Particularly preferably, four wheel belt units may be disposed on the first sub-platform in a five-belt configuration. A wheel belt unit is, compared, for example, to a one-belt unit or a middle belt unit, essentially of a more compact design and is dimensioned such that a wheel of a motor vehicle may be placed on an upper run.

Due to the divisible and separable weighing platform, the conversion becomes even less costly and complex. The (preferably upper) first sub-platform preferably has all the necessary structures, such as wheel belt units and fastening device(s), already pre-installed on a surface so that these components may be mounted all together (simultaneously) with the installation of the first sub-platform.

Particularly preferably, the first sub-platform with the structures arranged thereon is already pre-weighed, so that this weight value is already known. The second sub-platform is, in particular, used alone (without the first sub-platform) when a one-belt or three-belt configuration is to be used. In the one-belt configuration, a large one-belt unit being preassembled with all the associated frame parts is mounted on the upper part of the frame of the test stand and is preferably held in position by the weight force alone. The same applies to the side belt units of the three-belt configuration. In other words, the divisibility of the weighing platform allows performing the conversion in substantially two (main) steps: (de-)mounting the one-belt unit/three-belt units, and (de-)mounting the first sub-platform with the preassembled structures. This can be performed within a short time and without complex interventions by technicians.

The at least one wheel belt unit and fastening device(s) may be supported slidably, and particularly preferably lockably, on the first sub-platform. In other words, the wheel belt unit(s) and/or the holding device(s) may be supported movably or slidably (in as friction-free a manner as possible) on the first sub-platform, so that they can be adapted to the dimensions of the motor vehicle in a fast and easy manner by means of displacement. A locking ability allows for a fixation in the desired position.

The weighing platform may comprise at least two sub-platforms that may be supported separably. On the first sub-platform, at least one wheel belt unit and a fastening device of the five-line configuration may be arranged in a pre-installed manner. The at least two sub-platforms may be connected with each other in a five-belt configuration of the wind tunnel test stand. A first sub-platform may be separated from the second sub-platform in a three-belt or one-belt configuration of the wind tunnel test stand and particularly preferably removed from the test stand. This set-up allows, as discussed above, for a particularly fast conversion, since the upper first sub-platform may already hold all (additional, alternative) necessary components for a five-belt configuration. Thus, a very fast and effortless switch between the one-belt and five-belt configuration, i.e., between the two most commonly used configurations in terms of racing and passenger cars, is possible.

Furthermore, the wind tunnel test stand may comprise at least one fastening device. The fastening device may be adapted to hold a motor vehicle in/at a predetermined position on the conveyor belt. In a five-belt configuration of the wind tunnel test stand, the fastening device may be disposed on a first sub-platform of the weighing platform. In a three-belt or one-belt configuration of the wind tunnel test stand, the fastening device may be disposed on a second sub-platform of the weighing platform.

The fixation of the vehicle makes it possible to safely hold the motor vehicle at a predefined position, so that no incorrect measurements or parasitic forces are generated by the motor vehicle leaving this position or deviating from it under application of force, for example. In other words "holding" the vehicle on the conveyor belt means that the vehicle maintains its predetermined position on the conveyor belt during aerodynamic tests or other tests, i.e., does not deviate from this position.

The fastening device (restraint system) of the one-belt and three-belt configurations may, for example, be comprised of two fastening supports or bars (first fastening means) which may be positioned laterally of the conveyor belt. Furthermore, it may include holding means (second fastening means) such as ropes, belts, straps, bars and/or combinations thereof which may be arranged on the fastening supports and, furthermore, may, for example, be disposed at corresponding receptacles on the motor vehicle frame by means of receptacles. A (fixed) arrangement of the fastening device on the platform may be implemented, for example, by means of a non-positive and/or positive connection.

In particular, and more preferably, the fastening device on the second sub-platform may be detachably or releasably connected thereto, so that the fastening device can be removed during conversion to a five-belt configuration, if this be desired for lack of space.

The first and second sub-platforms may comprise at least one pre-defined (mechanical or force) coupling interface, wherein at least the X-, Y- and Z-forces between the first and second sub-platforms may be transferable via this coupling interface. Furthermore, ports for transferring fluidic media and/or transmitting electrical currents may be provided at the one or more coupling interfaces. Furthermore, separate coupling interfaces for fluid media and/or of electrical currents may also be provided.

In the simplest case, the (force) coupling interface(s) may be predefined planar surfaces, which may be arranged on two opposite surfaces of the two platforms, respectively, such that they rest on one another in the assembled state. The coupling interface may include feet, protrusions, pins or the like, which may come to rest on an opposite surface or recess of the other sub-platform or may engage therewith. In addition, aligning devices may preferably be provided which cause an automatic alignment of the two platforms with respect to each other when these are coupled/connected to one another. The aligning devices may be small rollers that roll on pre-defined planes of the other sub-platform and thereby cause an alignment. The force transmission interfaces may further comprise (automatically) latching members, which lock during engagement—e.g., using a pin and recess solution.

The interface(s) or ports for fluidic media may preferably have automatic express couplings. For the transmission of electric current, coupling interface(s) or ports may be slidingly supported in a self-aligning manner, that is, the connector elements may be slidably supported, for example, such that they can slide towards each other in a self-aligning manner due to the form of guiding planes or the like.

Further, the force sensing means which may connect the weighing platform and the test stand frame may be arranged on the second sub-platform. Preferably, at least force sensing means are provided with which Z-forces can be detected. In particular, this allows for the detection of weight forces, lift forces, and downforces that occur or vary during the tests. Particularly preferably, additional force sensing means may be provided between the test stand frame and the second sub-platform, with which X- and/or Y-forces can be detected, so that lateral forces can be represented as well. The attachment to the second sub-platform has the advantage that during conversion the exchange or relocation of the force sensing means may be omitted, further accelerating the conversion.

An X-force measuring means may be arranged such that a force between the weighing platform and the test stand frame in the X-direction can be sensed. A Y-force measuring means may be arranged such that a force between the weighing platform and the test stand frame in the Y-direction can be sensed, and a Z-force measuring means may be arranged such that a force between the weighing platform and the test stand frame in the Z-direction can be sensed.

The force measuring means can sense, for example, a small relative movement between the weighing platform and the test stand frame as a change in travel and output it as force value. Thus, the detection of forces separately for each direction of measurement is made possible. The force values may, for example, be passed to an evaluation unit—e.g., a computer. The force measuring means (or force sensing means) may, for example, be load cells, which convert a change in travel, expansion, compression, tension and/or pressure into an electrical force signal based on strain gauges or in a piezoresistive or piezoelectric fashion. The force measuring elements may each be arranged between two respective Eulerian columns so that only forces that are normal to the direction of the Eulerian columns are transmitted to the force measuring elements. The Eulerian columns may, for example, have forms/notches that are twisted relative to each other by 90° in order to substantially only transmit forces in the normal direction relative to the column axis to the load cell.

Furthermore, a disturbing-force sensing means may be arranged between the carriage and the second sub-platform, in particular sensing X- and/or Y-forces. The disturbing-force sensing means may be arranged between the carriage and the weighing platform such that a force between the weighing platform and the carriage in the X-direction can be sensed, so that a ventilation loss, a rolling friction loss, aerodynamic losses between the conveyor belt and the motor vehicle and the like can be sensed separately. The losses may be evaluated or sensed in an isolated or separated manner, for example, by sensing a small relative movement between the carriage and the weighing platform, so that the measurement accuracy of the entire wind tunnel balance can be further increased. The disturbing-force sensing means is preferably arranged on the weighing platform in addition to the X-, Y- and/or Z-force measuring means.

Below a top run of the at least one conveyor belt of a belt unit, preferably a mount may be arranged, the bearing preferably being a weighing pad. The weighing pad may be arranged such that the motor vehicle, when it is fixed on the conveyor belt, rests on the conveyor belt with the vehicle wheels being above the at least one weighing pad. Furthermore, the at least one weighing pad may sense forces in the Z-direction, in particular the weight force of the motor vehicle and lift forces and/or downforces. The optional weighing pads, which in general may be connected to a measuring sensor system, may thus sense, for example, forces in Z-direction such as the weight force of the motor vehicle and lift forces or downforces.

The weighing pads sense the wheel vertical forces and, after their summation, the sum of the Z-forces, i.e., vehicle weight force, lift forces, downforces, and parasitic forces in Z-direction. Furthermore, additional moments about the X- and/or Y-axis can be sensed by detecting a deflection of the weighing pads from the zero-point position. Here, weighing pad refers to any measuring device that can be used for measuring Z-forces, particularly for through-belt measurements. Preferably one weighing pad is provided for each vehicle wheel. That is, usually four weighing pads are provided.

The fastening device may hold the motor vehicle on the conveyor belt in a fixed position, in particular above the at least one weighing pad. The fastening device may be configured such that forces in X-, Y- and/or Z-direction can be transferred from the motor vehicle to the weighing platform via the fastening device. Particularly preferably, the wind tunnel balance may, by means of a Z-force measuring means, sense parasitic Z-forces separately, which are transmitted via the fastening means and the weighing platform to the Z-force measuring means. This makes it possible to sense parasitic Z-forces that are included in the measured values of the weighing pad separately using the Z-force measuring means.

Furthermore, the invention comprises methods for converting a wind tunnel test stand according at least one of the above-explained aspects and examples. A conversion from a three-belt or one-belt configuration to a five-belt configuration may comprise the initial step of lifting and removing the one-belt unit of a one-belt configuration or the side belt units (and possibly the middle belt unit) of a three-belt configuration from the carriage. Subsequently, the first sub-platform may be placed on (the coupling interface of) the second sub-platform with pre-installed wheel belt units and fastening device. Next, the middle belt unit may be positioned between the wheel belt units. The wheel belt units may also be placed individually on an indivisible weighing platform.

For a conversion from a five-belt configuration to a three-belt or one-belt configuration, the first sub-platform with the pre-installed wheel belt units and the fastening device may be lifted and removed from (the coupling interface of) the second sub-platform. Subsequently, the one-belt unit may be arranged on the upper frame element. In the case of a three belt configuration, the middle belt and the side belts may be placed instead of the one-belt unit.

The conversion according to the methods described above may be used without major intervention of assembling personnel and can be carried out quickly, so that significant cost savings can be achieved by the wind tunnel users.

In summary, the wind tunnel test stand and the methods for conversion described have considerable advantages in terms of versatility and usability of the test stand because the test stand can be converted quickly and inexpensively into various configurations for different testing purposes. Furthermore, the wind tunnel test stand of the invention may have the advantage that increased measurement accuracy can be achieved. In particular in the three-belt and one-belt configurations, parasitic Z-forces can be separately detected and the considerable weight of the wind tunnel balance can be diverted to separate mounts, i.e., not through the weighing platform. With respect to the test stand frame, the weighing platform may be supported such that it is movable relative thereto or may be supported resiliently by means of the force sensing means. The weight of the belt unit and a (motor) vehicle resting thereon can be supported by the carriage. Furthermore, the measurement accuracy, in particular in the three-belt and one-belt configurations, can be increased by the fact that parasitic forces in Z-direction can be sensed separately by means of the Z-force measuring means which may be arranged between the weighing platform and the test stand frame. The term belt unit frame may, for example, include all components which form the basic framework on which, e.g., the rollers of the belt unit and the conveyor belt may be arranged. The belt unit frame may be one piece or several pieces. Typically, each belt unit may essentially include a belt unit frame, a conveyor belt and two rollers. Further belt unit components such as a driving means for driving the conveyor belt, hydraulic systems, electrical systems, etc., which are not discussed further herein, might be added later.

The apparatus set forth herein and the accompanying method are described by way of example in the following with reference to the accompanying schematic drawings. In the figures:

DETAILED DESCRIPTION

Figure 1:
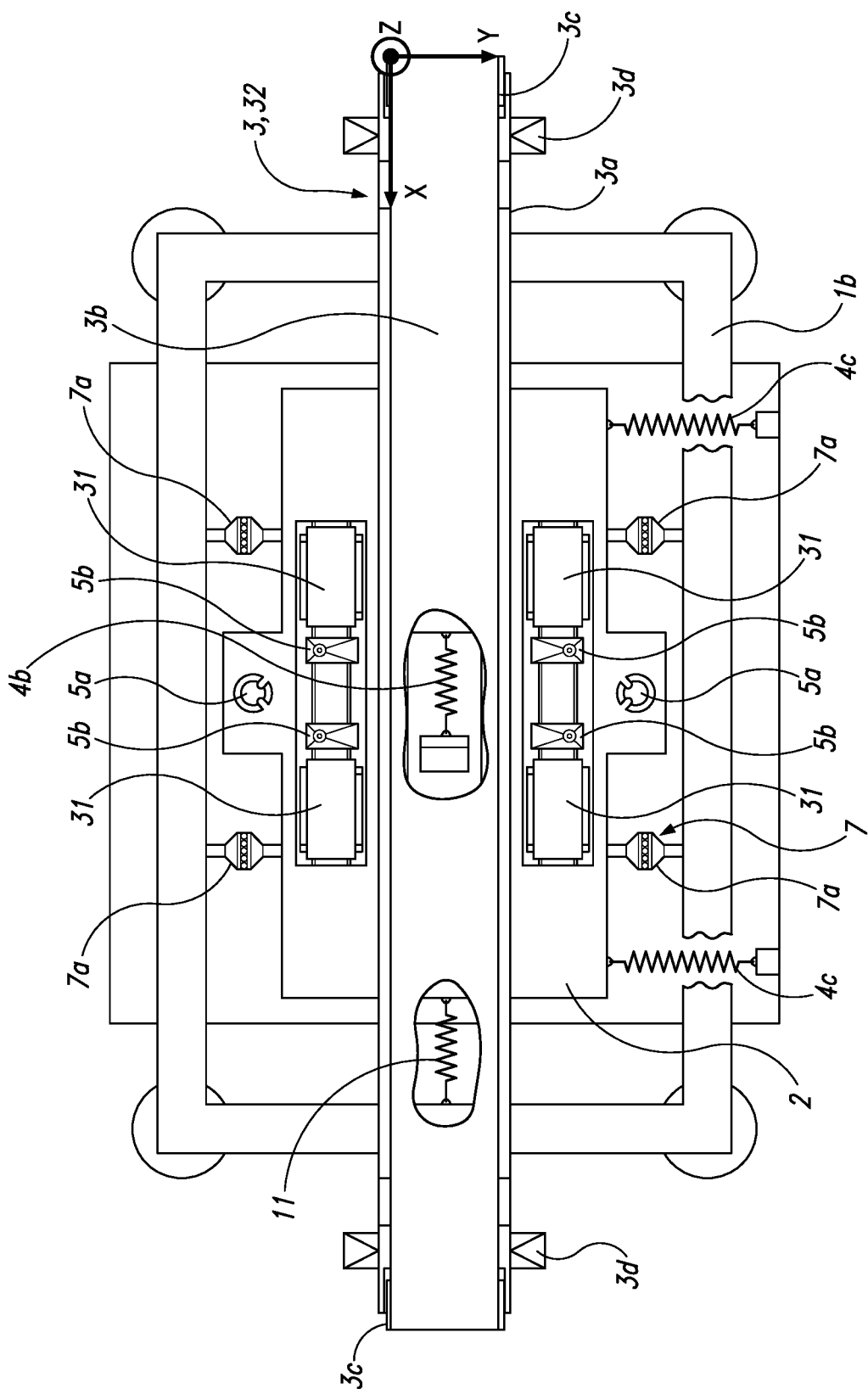
FIG. 1 shows a plan view of a wind tunnel balance in a five-belt configuration.

In the following, various examples are described in detail and with reference to the figures. Herein, same or similar elements in the figures are designated with the same reference numerals. The present apparatus and method are not limited to the disclosed combinations of features. Rather, other modifications and combinations of features of different examples are intended to be encompassed within the scope of the independent claims.

Figure 2:
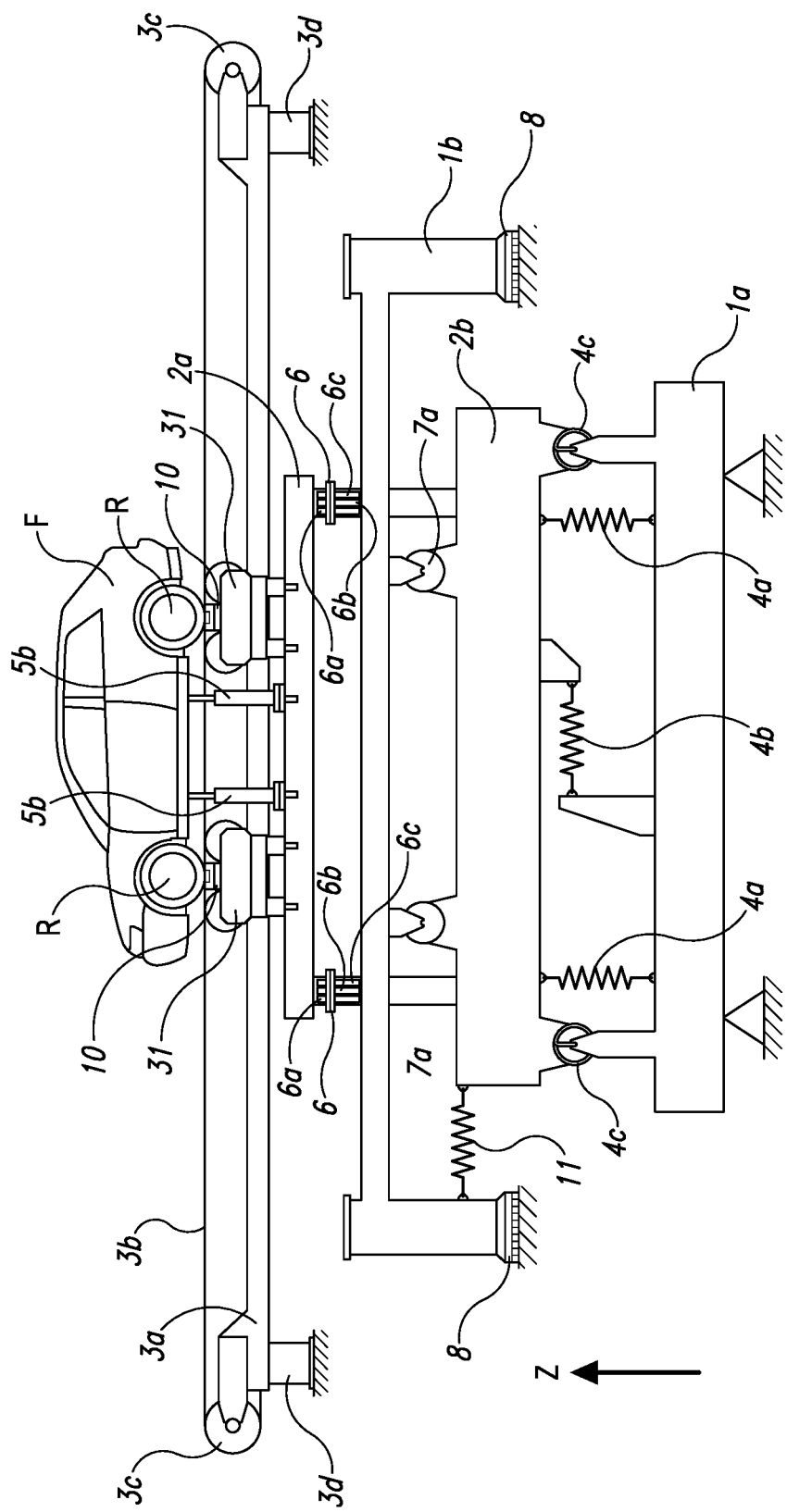
FIG. 2 shows a side view of a wind tunnel balance in a five-belt configuration.

In FIGS. 1 and 2, the arrangement or configuration of a five-belt design is shown in the plan view. On the (optional rotatable) test stand frame 1a (FIG. 2), a weighing platform 2 is mounted, which senses forces in X-, Y-, Z-directions by means of force sensing means 4, wherein the Z-force sensing means 4a may also support the weighing platform 2. Directly at the weighing platform 2, more precisely on an upper first sub-platform 2a, wheel belt units 31 and rocker supports/rocker panels 5b of a fastening device 5 are pre-assembled.

The pre-assembled fastening means 5 and the four wheel belt units 31, on each of which one wheel R of a motor vehicle F may rest, make it possible that the upper platform 2a, which is removably connected to the second, lower sub-platform 2b, can be quickly installed completely. The first sub-platform 2a only needs to be placed on the lower, second sub-platform 2b. For this purpose, optional coupling interfaces 6 may be provided, which may allow a defined and reproducible 2a docking of the upper, first sub-platform.

FIG. 2 shows these coupling interfaces 6 schematically as flanges. Preferably, no further fastening with tools such as screws or the like is required. The two sub-platforms 2a, 2b are resting safely on one another due to the weight. However, in support and for increasing the safety, positively connecting structures may be provided in order to prevent, for example, a relative displacement. Here, for example, mandrels or projections may be provided, which can engage with correspondingly shaped receptacles.

Furthermore, the weighing platform 2 is laterally connected to the test stand frame 1a via Y-force measuring means 4c (see FIG. 1) which are disposed at a lower portion of the second sub-platform 2b, as, in particular, FIG. 2 shows. A (relative) movement of the weighing platform 2 in the Y-direction is thus detected by the Y-force measuring means and the forces in the Y-direction can be measured. Similarly, an X-force sensing means 4b which can correspondingly detect an X-force between weighing platform 2 and the test stand frame 1a is arranged between the test stand frame 1a and the weighing platform 2.

The platform is supported in the test stand frame 1a in the direction of the vertical axis (Z-direction) via Z-force measuring means 4a—only two are shown, while three or four are preferred. Sensed forces are represented, for example, by means of an evaluation unit (not shown). The forces along the axis of travel (X-forces) are sensed using the at least one X-force measuring means 4b. The forces transverse to the axis of travel (Y-forces) are sensed/measured using at least one, preferably two Y-force measuring means 4c. Two Y-force measuring means 4c which are disposed laterally on the platform 2 (of the second sub-platform 2b) and spaced apart in the X-direction with respect to each other may be provided. The opposite end of the Y-force measuring means 4c is fixed to the test stand frame 1a.

In the figures, all force-measuring means 4 are shown schematically as simple spring elements. In the real arrangement, load cells or strain gauges (or strain gauges integrated into load cells), which are located centrally within an Eulerian column or between two of them, are preferably used (other force-measuring devices are also possible, however). An alternative attachment or arrangement of the force measuring means 4 is also possible, of course.

The weighing platform 2 is, for example, a component which may be located centrally in the test stand frame 1a. The distances between the weighing platform 2 and the test stand frame 1a shown in FIG. 1 serve the purpose of better illustration, i.e., much smaller or larger distances may be used. The design of the weighing platform 2 may be plate-like with a substantially rectangular basic shape, as shown in FIG. 1. However, a more complex form of the weighing platform 2 is also possible according to the invention. The weighing platform 2 does not necessarily have to be plate-shaped. This also applies to the two sub-elements or sub-platforms 2a, 2b of the weighing platform 2.

The fastening device 5 already explained above which is mounted on the first sub-platform 2a in a locked manner is, in particular, configured to hold the motor vehicle F safely in the predetermined position on the conveyor belt 3b.

The first sub-platform 2a is fixedly connected to the second sub-platform 2b, so that forces can be transmitted from the motor vehicle F to the platform 2 and may be sensed there by means of the above-described force sensing means 4. The fixed connection between the two sub-platforms results, in particular, from the weight force due to which the first sub-platform 2a safely rests on the second sub-platform 2b.

A carriage 1b shown in side view in FIG. 2 is connected to the weighing platform 2 via an additional measurement means with the reference sign 11. The carriage 1b will be explained in more detail in conjunction with the following figures.

Furthermore, both FIGS. 1 and 2 also show a middle belt unit 32 which is disposed between the wheel belt units 31 and provides a long conveyor belt 3b which rolls around the rollers 3c of the middle belt unit 32. This middle belt simulates the driving surface of the motor vehicle F to be tested, which rolls between the wheels R. The rollers 3c of the middle belt unit 32 are suspended or supported in a belt unit frame 3a.

In addition, FIG. 2 shows that the wheel belt units 31 may have mounts 10 for wheels R below the conveyor belts, i.e., below the wheel R. The wheel belt units 31 have so-called trapezoidal mounts supporting the upper run of each conveyor belt 3b instead of the conventional mounts 10 for wheels.

It should be noted that FIG. 1 shows a five-belt system in plan view and with drawing-related gaps. The gaps are intended to make the forces force sensing means, in particular 4b and 11, which are arranged under the conveyor belt 3b visible. Of course, these (drawing-related) gaps do not exist in reality.

It should also be noted with regard to FIG. 1 that a unilateral arrangement of Y-force measuring means 4c is shown. This may be already sufficient to perform an accurate measurement. Furthermore, it is apparent from the schematic drawing that the weighing platform 2 laterally (in Y-direction) in each case projects beyond the outer lateral edge of the conveyor belt(s) 3b to the extent that fastening supports 5a of a fastening device 5 of the single-belt or three-belt configuration may find space on the projected portions or may protrude therefrom.

Figure 3:
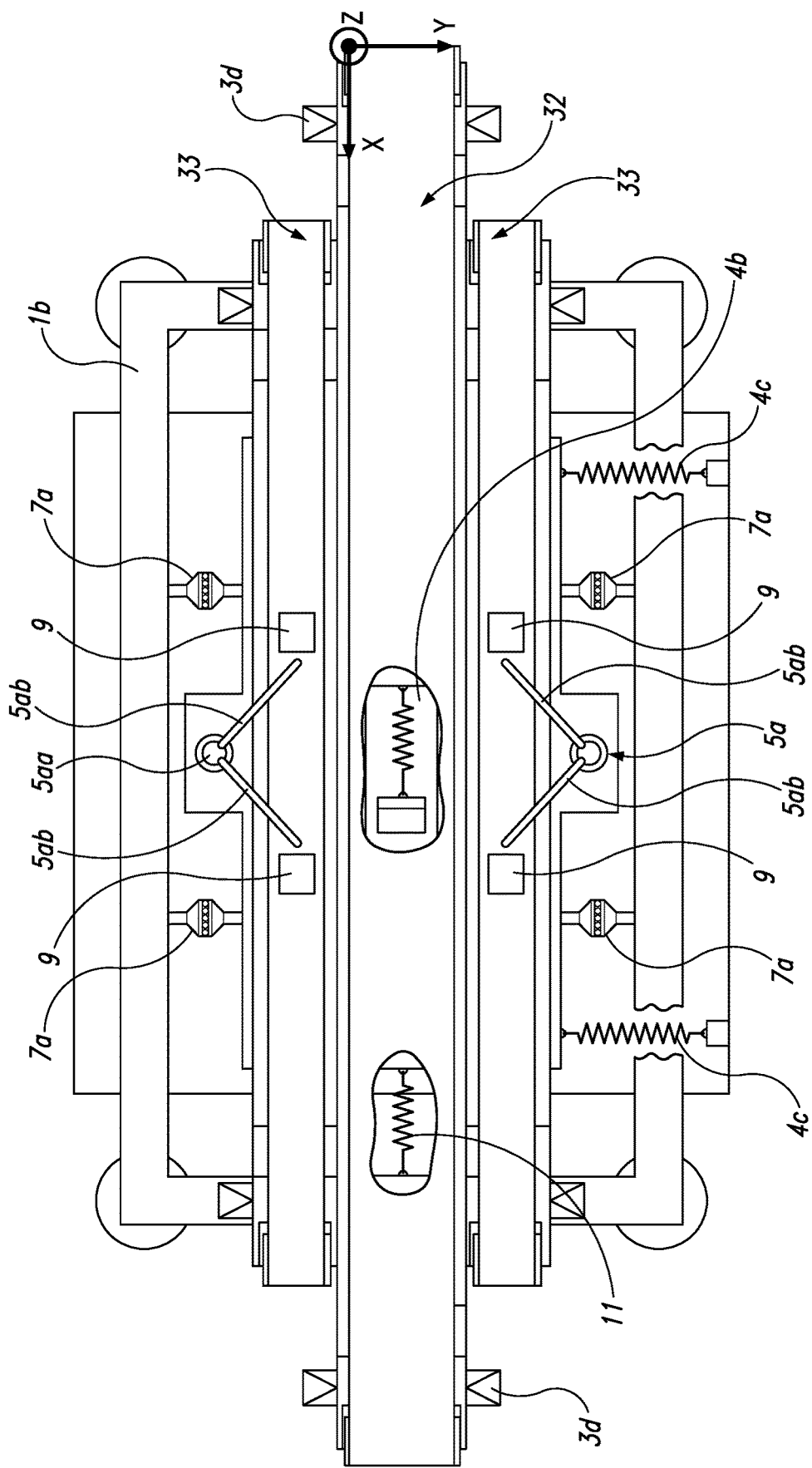
FIG. 3 shows a plan view of a wind tunnel balance in a three-belt configuration.
Figure 4:
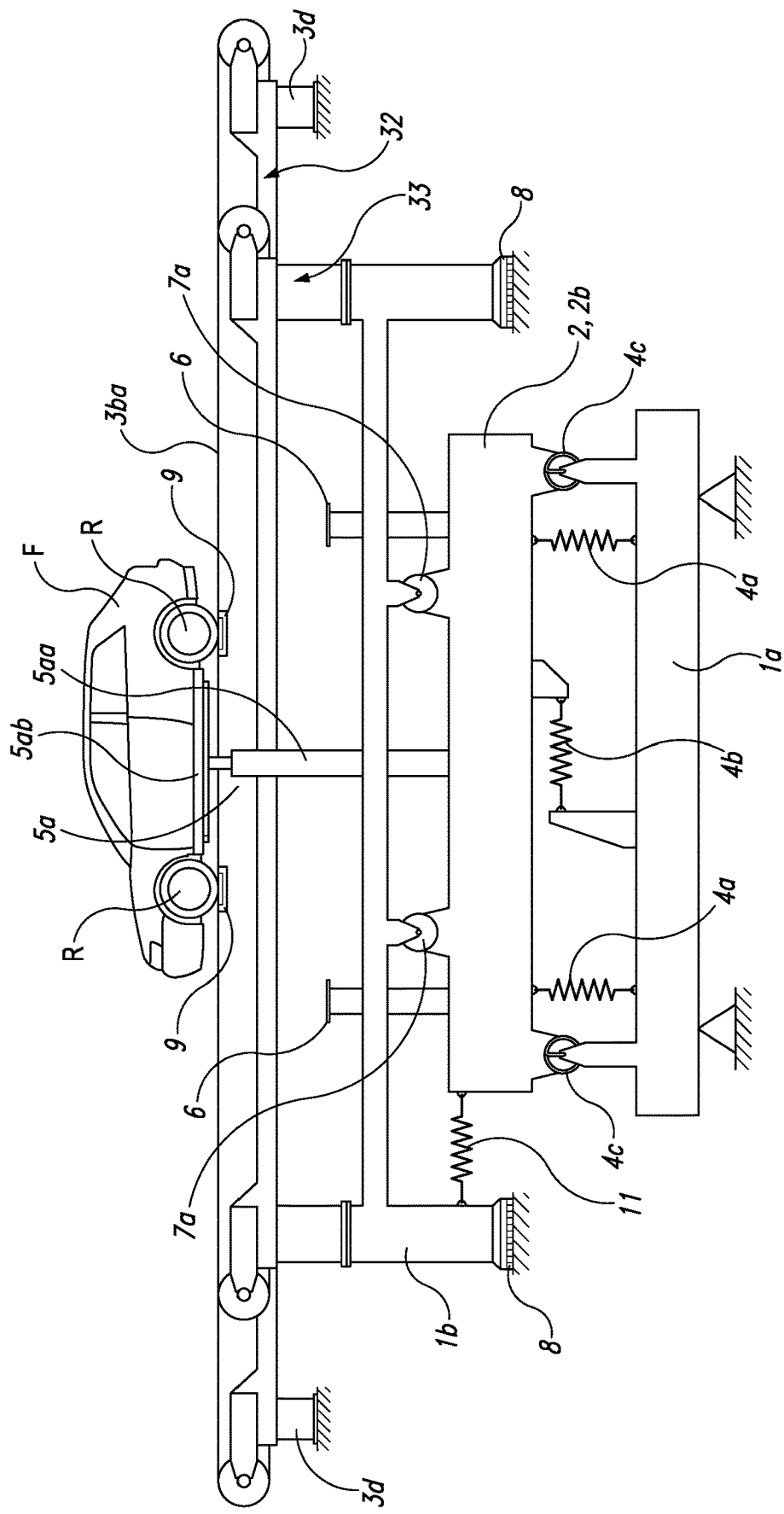
FIG. 4 shows a side view of a wind tunnel balance in a three-belt configuration.

In FIGS. 3 and 4, a conveyor belt arrangement is shown which may reproduce a so-called "single-belt" by means of two side conveyor belts 33. In other words, the figures show a three-belt configuration. Preferably, as shown in FIG. 4, only the side conveyor belts 33 are connected to the carriage 1b. The mid conveyor belt 32 is fixedly supported on a foundation or on the frame 1a via the mount 3d. It would also be possible that all three belt units 32, 33 are supported on the carriage 1b.

With regard to the mounting of the lower, second sub-platform 2b, there is preferably no difference to the above-described five-belt configuration. However, the first sub-platform 2a has been removed from the test stand 1 so that the coupling interfaces 6 can remain unoccupied. The motor vehicle F is held by a holding/restraint system 5a instead of rocker supports 5b on the conveyor belt 3a. The system includes two fastening supports 5aa shown, which are preferably are fixed perpendicularly in Z-direction, laterally of the conveyor belts 3b of the side belt units 33 (preferably in central position of the wind tunnel test stand with respect to the X-direction), respectively, on the second sub-platform 2b. The fastening supports 5aa connected in a (positionally) fixed manner, but preferably detachably, to the platform 2 or the second sub-platform 2b.

Moreover, FIGS. 3 and 4 show that the upper ends of the fastening supports 5aa in Z-direction project beyond the Z-height of the upper run 3ba of the conveyor belt 3b. Preferably, at least one second fastening means 5ab is attached in the projecting end portion of the fastening supports 5aa. The second fastening means 5ab is preferably a rope, a belt, a very thin rod or an assembly of various components such as ropes, belts, etc. and may have a receptacle at the end, which is arranged towards the vehicle F. Preferably, at least two second fastening means 5ab, which are disposed by receiving them in corresponding receptacles on the motor vehicle F, are provided for each side of the vehicle (in Y-direction). The second fastening means 5ab fixedly hold the vehicle F in a predetermined position on (relative to) the conveyor belt 3b. X-/Y-forces arising at the ropes may preferably be diverted through the ropes and may act as internal forces.

If, for example, the second fastening means 5ab, for example, are not guided exactly in the horizontal, then parasitic Z-forces can result, which can be sensed by at least one weighing pad 9 below the upper run 3ba of the conveyor belt 3b. Furthermore, these parasitic Z-forces may also be directed isolatedly/separately to the Z-force measuring means 4a via the fastening device 5a. This makes it possible to offset or correct the measured Z-forces at the weighing pad 9 and at the Z-force measuring means 4a and thus to increase measurement accuracy.

In FIG. 3, the weighing pads 9 are arranged below the conveyor belt 3b and indicated in the figure by means of schematic squares. The weighing pads 9 sense a Z-force by means of through-belt measurement.

Furthermore, FIG. 4 shows that an additional force measuring means 11 is connected to the weighing platform 2. This allows for the separation of aerodynamic disturbing forces that may, inter alia, result from the air entrained with the conveyor belt 3b, and of forces arising at the wheels such as rolling, flexing and/or ventilation losses which are measured at said disturbing-force sensing means 11. The further aerodynamic forces are still available at the force measuring means 4 described above. Specifically, it is shown that the disturbing-force sensing means 11 is fixedly mounted at a forward end of the second sub-platform 2b in X-direction (a different position is possible, however). In contrast to the other force measuring means 4, the second end of the disturbing-force sensing means 11 is arranged at the carriage 1b, in this case on one of the side or column elements of the carriage 1b. Therefore, for example, sensing the relative movement in X-direction between the weighing platform 2 and the belt unit 3 is possible, allowing an additional and separate determination of the ventilation losses at the wheels of the vehicle F. These ventilation losses can be offset, for example, against the other sensed force values to increase the accuracy of the wind tunnel balance.

As particularly shown by FIG. 4, the carriage 1b supports the side belts 33. In Z-direction, the carriage 1b is supported on the foundation via a floating mount 8, in Y-direction, there is a coupling to the weighing Platform 2 by means of a so-called Y-mount 7a of a connecting device 7. Also, the vehicle restraint system or the fastening device 5 is attached at the weighing platform 2 or the lower sub-platform 2b. The connecting device 7 is the same as the one shown in FIG. 1. Lateral bearings 7a, which allow for a relative movement between the sub-platform 2b and the carriage 1b which is as frictionless as possible, are part of the connecting device 7 and or constitute it. Thereby, a (rigid) coupling in Y-direction is achieved. The mounts 7a of the connecting device 7 are shown as sliding mounts, fluidic mounts, and/or roller mounts being arranged on side parts of the carriage 1b and the weighing platform 2. The connecting device 7 allows for a coupling in Y-direction and prevents a relative movement of the two components (the weighing platform 2 and the lower sub-platform 2b or weighing platform 2) in Y-direction. In X-direction, however, relative movement between the weighing platform 2 and the carriage 1b which is as friction-free as possible may occur, i.e., it is not prevented. Consequently, there is a rigid coupling between the carriage 1b and the sub-platform 2b in Y-direction.

Figure 5:
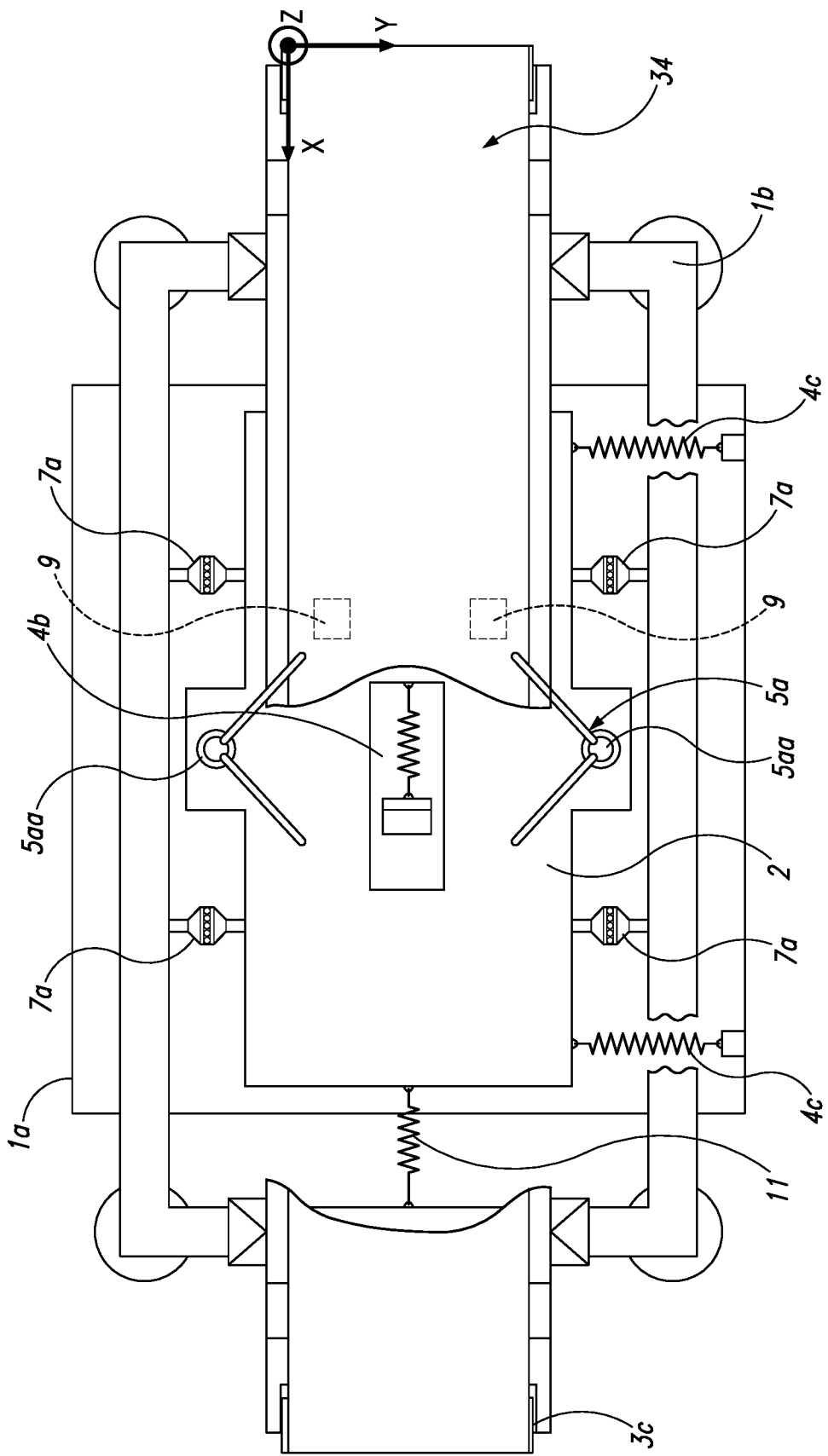
FIG. 5 shows a plan view of a wind tunnel balance in a one-belt configuration and FIG. 6 shows a side view of a wind tunnel balance in a one-belt configuration.
Figure 6:
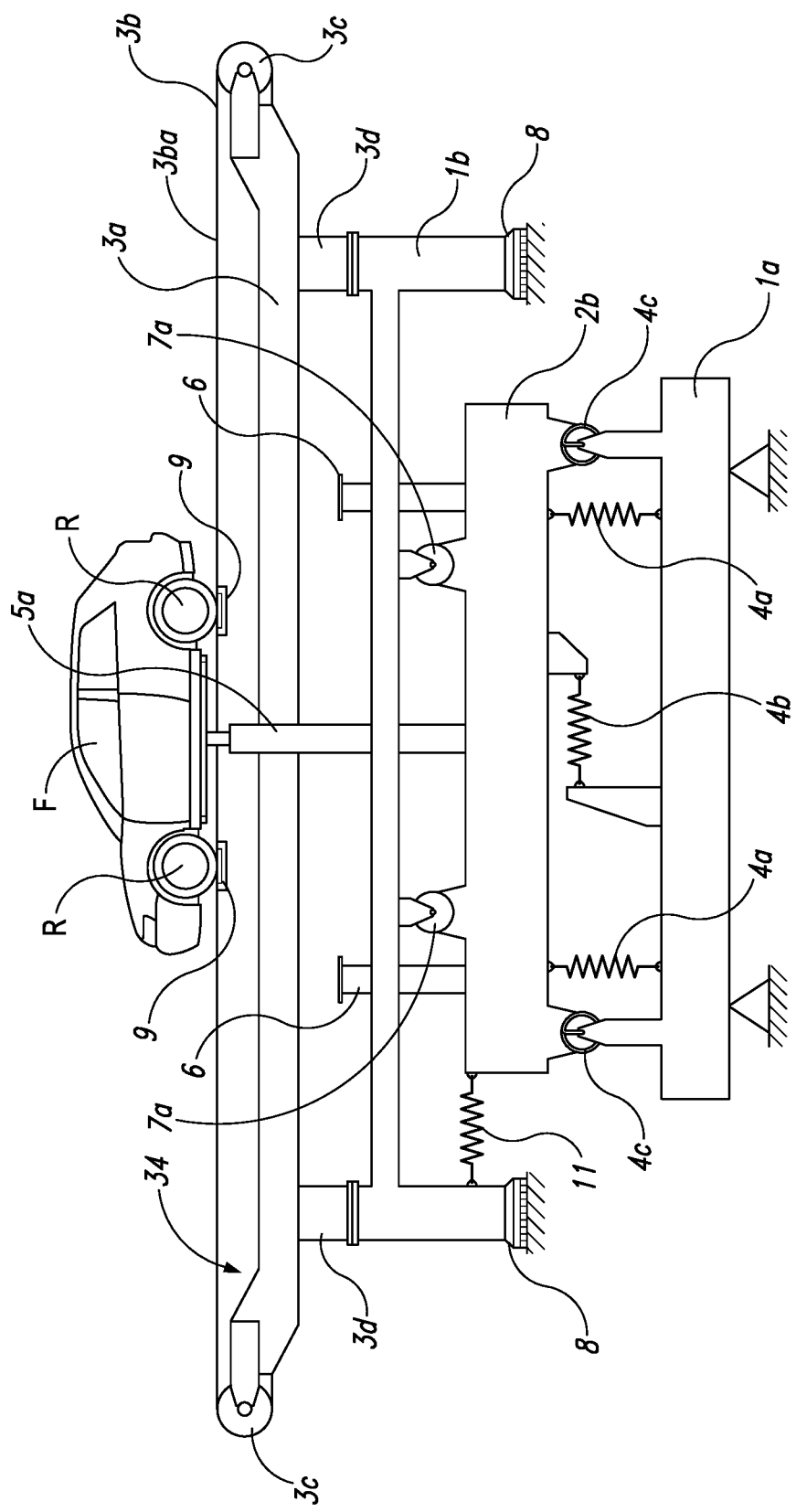

Furthermore, FIGS. 5 and 6 show the arrangement "single belt" or a one-belt configuration. The mounting of the individual components and the structure are similar to the three-belt configuration described above. However, only a single large belt unit 3, the one-belt unit 34, is mounted, which rests with its entire weight on the carriage 1b. The upper part of the weighing platform 2, i.e., the second sub-platform 2b, has been removed together with the wheel belt units 31 and the fastening device of the five-belt configuration.

The carriage 1b is supported in such a way (as can be seen, in particular, in the plan view of FIG. 5) that the carriage 1b is relatively movable in X-direction (via the force sensing means shown) both with respect to the test stand frame 1a and the weighing platform 2. The carriage 1b supported floatingly on the floating mounts 8 is connected to the weighing platform 2 via the disturbing-force sensing means 11, so that a relative movement between these two components with respect to the force transmitted thereby can be sensed, if so desired. The vehicle restraint system 5 is positively connected to the weighing platform 2. While the carriage 1b is supported on the foundation in Z direction, i.e., vertically, the frictionless mounts 7a (see FIG. 5) are supported on the weighing platform 2 in Y-direction. This makes it possible that the (global) aerodynamic forces in Y-direction, for example, due to obliquely incident flow, are sensed at the weighing platform 2. The disturbing-force sensing means 11 which connects the carriage 1b or the single-belt to the weighing platform 2 in X-direction makes it possible to separate the wheel frictional forces from the forces which are sensed by the weighing platform 2 in X-direction and thereby to visualize them.

Again, it is to be noted that the cut-outs and gaps of FIG. 5 are merely drawing-related in order to make, in particular, the components/parts of the test stand 1 arranged under the conveyor belt 3b visible.

It should also be noted that the connecting device 7 is shown (rigidly) coupling the weighing platform 2, 2b to the carriage 1b with respect to the Y-direction and comprising sliding or roller mounts with four individual mounts 7a laterally arranged on the second sub-platform 2b. The frictionless mounts (8) can also be embodied as articulated mounts, i.e., the mounts are then composed of rod-shaped or column-shaped supports that have cross-sectionally tapered sections (grooves, recesses) that are twisted relative to each other in axial direction by 90°, for example. It is also possible to provide each support with more than two cross-sectionally tapered sections. The movement amplitude is usually more limited when supporting with articulated carriers than in case of sliding or roller mounts.

In the case shown, the connecting device 7 allows, in other words, for a relative movement between the weighing platform 2 and the carriage in X-direction. On the one hand, X-forces may be sensed by means of X-force sensing means between the test stand frame 1a and the weighing platform 2b and, on the other hand, ventilation and wheel friction losses in X-direction may be measured by means of the disturbing-force sensing means 11 arranged between the carriage 1b and the weighing platform 2.

The weight forces of the one-belt unit 34 are directed in Z-direction to the foundation or the test stand frame 1a shown via the (substantially) frictionless floating mounts 8.

FIG. 6 also shows that the belt unit frame 3a of the one-belt unit 34 holds two rollers 3c supported rotatably. Around these rollers 3c a continuous conveyor belt 3b is arranged (wound) which can be set in motion, for example, by a rotating movement of the rollers 3c. The conveyor belt 3b has, at the one-belt unit 34, a width which is greater than that of the motor vehicle F to be tested. The test stand frame 1a may be supported rotatably about the Z-axis mounted with respect to its surroundings (not shown).

In summary, the apparatus described herein allows for an increased accuracy in combination with a fast and less costly convertability between different configurations of the test stand 1.

The conversion according to the method described herein comprises, during a conversion from the five-belt set-up shown in FIG. 1 to a three-belt or one-belt set-up according to FIG. 3 or 5, substantially the following steps. The middle belt 32 and the first sub-platform 2a are removed (preferably initially). Thereafter, the one-belt unit 34 may be mounted on the carriage, if a one-belt configuration is to be established. The connections associated with force transmission between the carriage 1b and the one-belt unit 34 do not need to be secured with additional effort, since the one-belt unit 34 preferably rests securely on the carriage 1b due to weight alone. Furthermore, (mechanical) guides and the like facilitating a precisely fitting and reproducible installation of the one-belt unit 34 may be provided.

Media ports (6a, 6b) between the lower part of the test stand 1 and the one-belt unit 34, such as those for compressed air, water and electric current, are preferably also connected with each other automatically when installing the one-belt unit. For this purpose, appropriate devices may be provided on the one-belt unit 34, the carriage 1b and/or both components. For example, ports which are supported in a translatorily self-aligning manner in X and Y-directions and can be guided towards each other by means of a guide may be provided. Also, for air and water supply connections, for example, self-locking express couplings may be provided.

In case that a three-belt configuration should be set up instead of a one-belt configuration, the above-described step of setting up the belt unit 3 changes in that a middle belt unit 32 and two side belt units 33 are mounted.

Other assembly work may include that the fastening device 5 is mounted on the second sub-platform 2b for the one-belt or three-belt configuration in case it has been demounted for the five-belt configuration.

The conversion according to the method described herein comprises, during a conversion from a three-belt or one-belt set-up according to FIG. 3 or 5 to the five-belt set-up shown in FIG. 1, substantially above steps in a different order. Initially, the belt unit(s) of the three-belt or one-belt set-up and, if necessary, the fastening device(s) 5a are removed. Then, the first sub-platform 2a and the middle belt unit 32 are installed, with the first sub-platform 2a already carrying the (main) components such as the wheel belt units 31 and the rocker supports 5b in a pre-installed manner. As described above, media ports and force connections are preferably automatically interconnected when placing the middle belt unit 32 and the first sub-platform 2a so that this does not have to be performed manually.

In summary, the method makes it possible to perform a very quick conversion with reduced effort and almost completely automatically.

LIST OF REFERENCE SIGNS test stand frame 1a
carriage 1b
motor vehicle F
weighing platform 2
belt unit 3
wheel belt unit 31
middle belt unit 32
side belt units 33
one-belt belt unit 34
belt unit frame 3a
conveyor belt 3b;
upper run 3ba
rollers 3c
belt unit mount 3d
force sensing means 4
Z-force sensing means 4a, X-force sensing means 4b, Y-force sensing means 4c,
sub-platforms: first 2a, second 2b
fastening device 5
holding system 5a;
first fastening means 5aa; second fastening means 5ab
fastening device 5b
coupling interface 6
fluidic coupling interface 6a
electrical coupling interface 6b
force transmission interface 6c
connecting device 7
floating mount 8
weighing pad 9
mount 10 for wheel R
disturbing-force sensing means 11

The invention claimed is:

1. A multiple configuration wind tunnel test stand that is at least convertible into a one-belt, three-belt and/or five-belt configuration, the test stand comprising:
   a test stand frame for receiving forces;
   a weighing platform which is supported relatively movably with respect to said test stand frame;
   at least one force sensing means arranged between said weighing platform and said test stand frame for sensing forces between said weighing platform and said test stand frame;
   at least one belt unit with a belt unit frame and a conveyor belt wound around two rollers; and
   a carriage for accommodating at least one belt unit of a one-belt or three-belt configuration, wherein said carriage is supported relatively movably with respect to said test stand frame in X- and Y-directions, and wherein said carriage is supported on a foundation via a floating mount in the Z-direction.

2. The wind tunnel test stand of claim 1 wherein said carriage and said weighing platform are coupled in X and/or Y direction such that a relative movement between said carriage and said weighing platform in the corresponding direction is prevented.

3. The wind tunnel test stand of claim 1 wherein, in a one-belt configuration, a one-belt belt unit is arranged on said carriage.

4. The wind tunnel test stand of claim 1 wherein, in a three-belt configuration, at least two side belt units are arranged on said carriage.

5. The wind tunnel test stand of claim 1 wherein, in the three-belt or five-belt configuration, a middle belt unit is provided between wheel belt units of the five-belt configuration or side belt units of the three-belt configuration, on which wheels of a motor vehicle to be tested can be placed, wherein said middle belt unit is fixedly supported on said carriage.

6. The wind tunnel test stand of claim 1 wherein said carriage directs forces in Z-direction into an environment and is floatingly supported in X- and Y-directions.

7. The wind tunnel test stand of claim 1 wherein said weighing platform includes at least first and second sub-platforms which are separably mounted, wherein at least one wheel belt unit and at least one fastening device of the five-belt configuration are arranged on said first sub-platform.

8. The wind tunnel test stand of claim 7 wherein said at least one wheel belt unit and said at least one fastening device are displaceably and lockably supported on said first sub-platform.

9. The wind tunnel test stand of claim 7 wherein said fastening device holds a motor vehicle on said conveyor belt in a fixed position, in particular above said at least one weighing pad, and said fastening device fixes said motor vehicle such that forces in X-, Y-, and/or Z-direction can be transmitted from said motor vehicle to said weighing platform via said fastening device.

10. The wind tunnel test stand of claim 1 wherein said weighing platform includes at least first and second sub-platforms, which are separably mounted, wherein:
   at least one wheel-belt unit and at least one fastening device of the five-belt configuration are arranged on said first sub-platform in a pre-installed manner, and
   said at least first and second sub-platforms are connected to one another in a five-belt configuration of said wind tunnel test stand, while the first sub-platform is separated from the second sub-platform in a three-belt or one-belt configuration of said wind tunnel test stand.

11. The wind tunnel test stand of claim 10 wherein said wind tunnel test stand includes at least one fastening device which is configured to hold a motor vehicle in a predetermined position on said conveyor belt, and wherein:
   in a five-belt configuration of said wind tunnel test stand, said fastening device is arranged on a first sub-platform of said weighing platform; and
   in a three-belt or one-belt configuration of said wind tunnel test stand, said fastening device is arranged on a second sub-platform of said weighing platform.

12. The wind tunnel test stand of claim 10 wherein at least one of said first and second sub-platforms includes at least one pre-defined coupling interface, wherein, via said coupling interface, at least X-, Y-, and Z-forces can be transmitted between said first and second sub-platforms and fluidic media and electric currents can also be transmitted.

13. The wind tunnel test stand of claim 12 wherein a fluidic coupling interface for the fluidic media includes automatic express couplings, the electrical coupling interfaces are slidably supported in a self-aligning manner, and the at least one pre-defined coupling interface includes force transmission interfaces, and wherein the force transmission interfaces include latching members between the force transmission interfaces and the sub-platform.

14. The wind tunnel test stand of claim 10 wherein said force sensing means which connects said weighing platform and said test stand frame is arranged on said second sub-platform.

15. The wind tunnel test stand of claim 10 wherein the at least one force sensing means includes at least one Z-force sensing means arranged between said test stand frame and said weighing platform.

16. The wind tunnel test stand of claim 15 wherein the at least one Z-force sensing means is arranged between said test stand frame and said second sub-platform.

17. The wind tunnel test stand of claim 10 wherein a disturbing-force sensing means is arranged between said carriage and said second sub-platform.

18. The wind tunnel test stand of claim 1 wherein at least one mount is arranged below an upper run of said at least one conveyor belt of a belt unit, wherein said mount is a weighing pad, and wherein:
   said weighing pad is arranged such that a motor vehicle, when it is fixed on said conveyor belt, rests on said conveyor belt with the vehicle wheels above said at least one weighing pad, and
   said at least one weighing pad senses forces in Z-direction, in particular the weight force of said motor vehicle and lift forces and/or downforces.

19. A method for converting a wind tunnel test stand, the method comprising:
   providing a multiple-configuration wind tunnel test stand that is at least convertible into a one-belt, three-belt and/or five-belt configuration, the test stand comprising:
      a test stand frame for receiving forces,
      a weighing platform which is supported relatively movably with respect to said test stand frame,
      at least one force sensing means arranged between said weighing platform and said test stand frame for sensing forces between said weighing platform and said test stand frame,
      at least one belt unit with a belt unit frame and a conveyor belt wound around two rollers, and
      a carriage for accommodating at least one belt unit of a one-belt or three-belt configuration, wherein said carriage is supported relatively movably with respect to said test stand frame in X- and Y-directions, and wherein said carriage is supported on a foundation via a floating mount in the Z-direction; and
   wherein for a conversion from a three-belt or one-belt configuration to a five-belt configuration:
      said one-belt unit is removed from said carriage,
      a first sub-platform is placed on a second sub-platform with pre-installed wheel belt units and a fastening device, and
      a middle belt unit is positioned between said wheel belt units; and
   wherein for a conversion from a five-belt configuration to a one-belt or three-belt configuration:
      said middle belt unit is removed,
      said first sub-platform with the mounted wheel belt units and the fastening device is removed from said second sub-platform, and
      said belt unit of the one-belt or three-belt configuration is disposed on said wind tunnel test stand.

* * * * *